(12) United States Patent
Urso et al.

(10) Patent No.: US 7,592,097 B2
(45) Date of Patent: Sep. 22, 2009

(54) ELECTROCHEMICAL CELL DESIGNS WITH ANODE PLATES AND CONNECTIONS WHICH FACILITATE HEAT DISSIPATION

(75) Inventors: Tina Urso, East Amherst, NY (US); Dominick Frustaci, Williamsville, NY (US); Esther S. Takeuchi, East Amherst, NY (US); Mark Visbisky, Depew, NY (US)

(73) Assignee: Greatbatch Ltd., Clarence, NY (US)

( * ) Notice: Subject to any disclaimer, the term of this patent is extended or adjusted under 35 U.S.C. 154(b) by 880 days.

(21) Appl. No.: 10/832,195

(22) Filed: Apr. 26, 2004

(65) Prior Publication Data

US 2005/0238953 A1 Oct. 27, 2005

(51) Int. Cl.
*H01M 8/10* (2006.01)
(52) U.S. Cl. ........................ 429/178; 429/170
(58) Field of Classification Search ............ 429/231.95, 429/179, 170, 163, 121, 122, 209, 65, 178
See application file for complete search history.

(56) References Cited

U.S. PATENT DOCUMENTS

| | | | |
|---|---|---|---|
| 690,181 A | 12/1901 | Pouteaux et al. | |
| 3,640,775 A | 2/1972 | Fitchman et al. | |
| 4,209,576 A | 6/1980 | Heurtel | |
| 5,227,267 A | 7/1993 | Goebel et al. | |
| 5,474,859 A | 12/1995 | Takeuchi et al. | |
| 5,486,215 A * | 1/1996 | Kelm et al. | 29/623.1 |
| 5,501,916 A | 3/1996 | Teramoto et al. | |
| 5,736,270 A | 4/1998 | Suzuki et al. | |
| 5,744,261 A * | 4/1998 | Muffoletto et al. | 429/131 |
| RE36,102 E | 2/1999 | Dougherty | |
| 5,948,556 A | 9/1999 | Hall et al. | |
| 6,010,800 A | 1/2000 | Stadnick et al. | |
| 6,235,426 B1 * | 5/2001 | Yanai et al. | 429/211 |

* cited by examiner

*Primary Examiner*—Patrick Ryan
*Assistant Examiner*—Monique Wills
(74) *Attorney, Agent, or Firm*—Michael F. Scalise

(57) ABSTRACT

Heat generation is an important concern of electrochemical cell design. The invention is directed toward a cell design that efficiently and responsively dissipates heat by transfer from the cell to the casing through multiple parallel connections. This invention relates to battery designs having cell stacks in which both the anode and cathode are of a plate structure and the anode plates are independently connected to the cell casing or connected thereto via a bridge or bus. They may also consist of cell assemblies of wound electrode configurations or plate-serpentine configurations having multiple parallel connections to the cell casing.

22 Claims, 9 Drawing Sheets

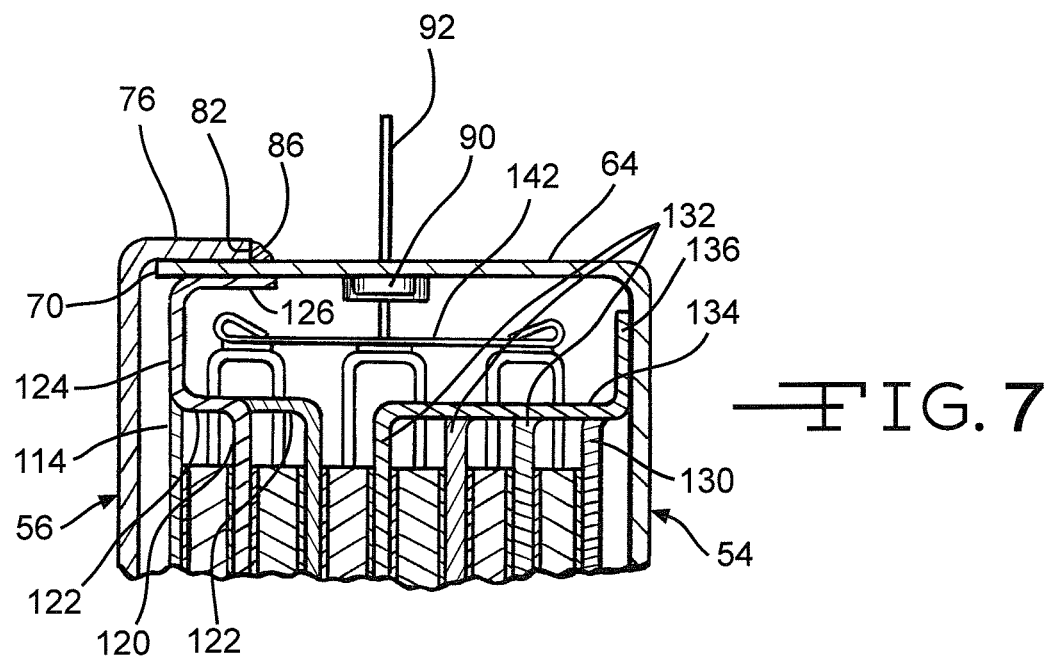
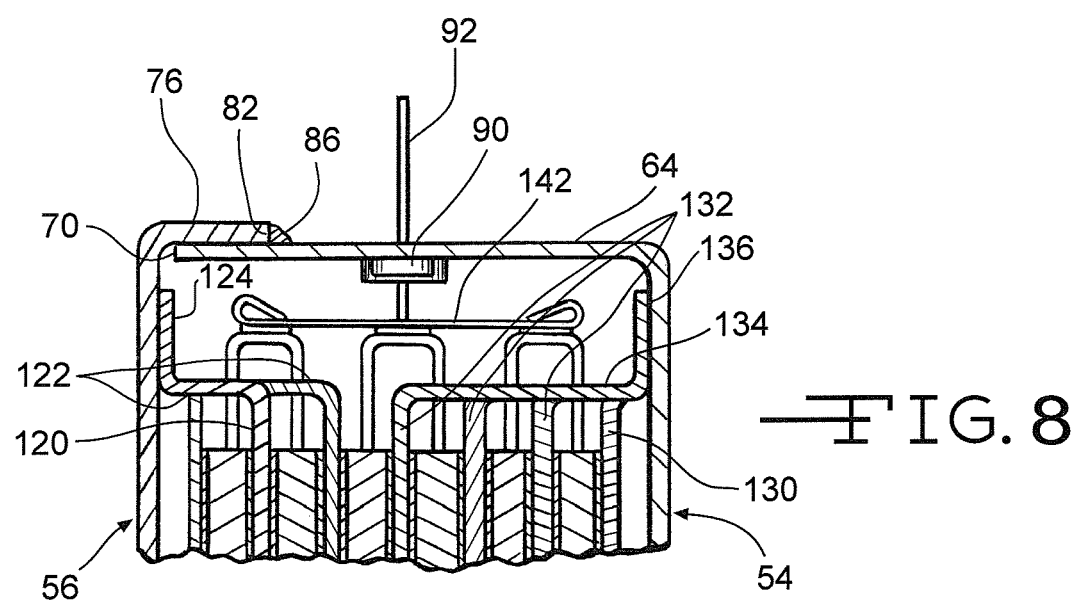

ELECTROCHEMICAL CELL DESIGNS WITH ANODE PLATES AND CONNECTIONS WHICH FACILITATE HEAT DISSIPATION

BACKGROUND OF THE INVENTION

1. Field of the Invention

The present invention relates to electrochemical cells generating electrical energy by means of a chemical reaction. Electrolytic cells, for example of the lithium/silver vanadium oxide (Li/SVO) type, are typically constructed of one or more layers of anode, separator, and cathode. A screen or foil current collector is enclosed in the anode and cathode to transport electrons. An electrode assembly may be built by stacking multiple layers or plates on top of each other or by winding one or more long strips of the stacked layers around a mandrel. The electrode assembly is placed inside a case and immersed in an electrolyte, which transports ions.

The number of electrode layers in a cell is a trade-off between current and capacity requirements. More plates or winds of the electrodes give more surface area between the anode and cathode and subsequently, higher current capability to the cell. However, less plates or winds require less passive parts (separator and screen or foil) and allow for more active material (cathode and anode), which results in higher capacity.

Safety is another important consideration in selecting design options involving plates, winds and the nature of the electrical connections. Particularly important is a design option that enhances transport of heat out of the cell. This is critical for batteries used to power implantable medical devices such as cardiac pacemakers and defibrillators. During an internal electrical short, electrical energy is converted to heat energy. To facilitate heat dissipation, it is desirable to conduct heat outside the cell as rapidly as possible so that internal temperature does not exceed the melting point of lithium. Such a temperature rise could cause hazardous venting of the cell.

2. Prior Art

FIG. 1 shows a traditionally wound Li/SVO cell 10 having a cathode connection 12 to the insulated terminal pin (not shown) and anode connections 14 to the cell casing (not shown). One end of the unitary wound anode is in the center and the other end is connected to the case wall. If there were an internal short at the center, bottom of the electrode assembly, one pathway would be for the heat to travel the full length and height of the anode to leave the cell.

FIG. 2 shows another form of a traditionally wound cell 20, often referred to as a galaxy-wound cell, having cathode connection tabs 22 and anode connection tabs 24. One of each of the two anode ends is in the center and one of each of the other anode ends is connected to the case wall. If there were an internal short in such a galaxy-wound cell, a similar heat travel pathway from the center, bottom of the electrode assembly is approximately half that of the traditionally wound cell.

FIG. 3 shows a traditional Li/SVO cell 30 having the cathode 32 made up of individual plates connected in parallel and the anode 34 wrapped around the cathode plates in a serpentine manner. Tabs 36 to a bridge-like connection structure 38 connect the cathode plates together and tabs 40 connect the anode to the cell casing (not shown). Heat transfer out of this traditional-plate cell design is similar to that of the galaxy-wound cell shown in FIG. 2.

However, there is a need to develop an electrode arrangement that enhances heat transfer from the cell in the event of an internal short circuit. This extends the applicability of current electrochemical cells to new varieties of applications.

SUMMARY OF THE INVENTION

The distance from the location of an internal short to the cell casing is critical. The present connection designs shorten this distance as compared to prior art arrangements to efficiently and responsively dissipate heat from an internal short to the casing through multiple parallel connections to the case wall. One form of this relates to battery designs having electrode assemblies in which both the anode and cathode are of a plate structure and the anode plates are independently connected to the case wall or connected via a bridge or bus to the case wall. The cell design may also consist of stacks of single or multiple anode elements having multiple parallel connections to the case wall. The potential for cell venting in such designs is minimized because the rate of heat leaving the cell is greater than that in traditional wound, galaxy wound, or cathode plate and serpentine anode type cells.

In that respect, the surface area of a plate structure cell according to the present invention can be larger than any of the above conventional designs without sacrificing safety since the rate of heat conduction out of the cell is augmented in contrast to conventional cells. The present invention is also applicable to cells having wound electrode assemblies and plate-serpentine electrode arrangements.

The foregoing and additional advances and characterizing features of the present invention will become clearly apparent upon reading the ensuing description together with the included drawings wherein:

BRIEF DESCRIPTION OF THE DRAWINGS

FIG. 7 is a sectional view taken along line 7-7 in FIG. 6 depicting one embodiment of electrode connections including a terminal pin.

FIG. 8 is a sectional view taken along line 8-8 in FIG. 6 depicting a second embodiment of electrode connections including a terminal pin.

DETAILED DESCRIPTION OF THE INVENTION

As previously described, in electrochemical cells to which the present invention is applicable, the number of layers of electrodes is a trade-off between current and capacity requirements. More electrode plates or winds give more inter-electrode surface area between the anode and cathode and, subsequently, higher current capability. Fewer plates or winds require fewer passive parts (separator and screen or foil) and allow for more active material (cathode and anode), which results in higher capacity. Winding an electrode assembly may be the preferred technique for manufacturing a cell stack because it eliminates extra connections between "like" plates, which add labor cost to a cell construction. It may also be desirable from a design point of view because these connections do not contribute to increased capacity or electrode surface area.

However, from a safety perspective, a wound electrode assembly may be less desirable than a stack of electrode plates with multiple connections between "like" plates because multiple connections enhance heat transport out of the cell. Electrical energy is converted to heat energy during an internal cell short. It can be shown that the greatest amount of power generated by a cell occurs when the resistance across a short equals the internal cell resistance. During maximum power the greatest amount of heat is generated. To facilitate heat dissipation during an internal short, it is desirable to conduct heat outside the cell as rapidly as possible so that the lithium temperature does not exceed its melting point (approximately 180° C.). Such a temperature rise may cause cell venting.

In a case-negative cell design, one pathway is for heat to travel through the anode connections and the case wall via conduction. Heat then leaves the cell via convection. In this pathway, the rate of heat flow by conduction through the anode assembly is proportional to the anode area normal to the direction of the heat flow and inversely proportional to its length of travel along the anode. The rate of heat flow by convection is related to the surface area of the outside case wall.

Figure 1:
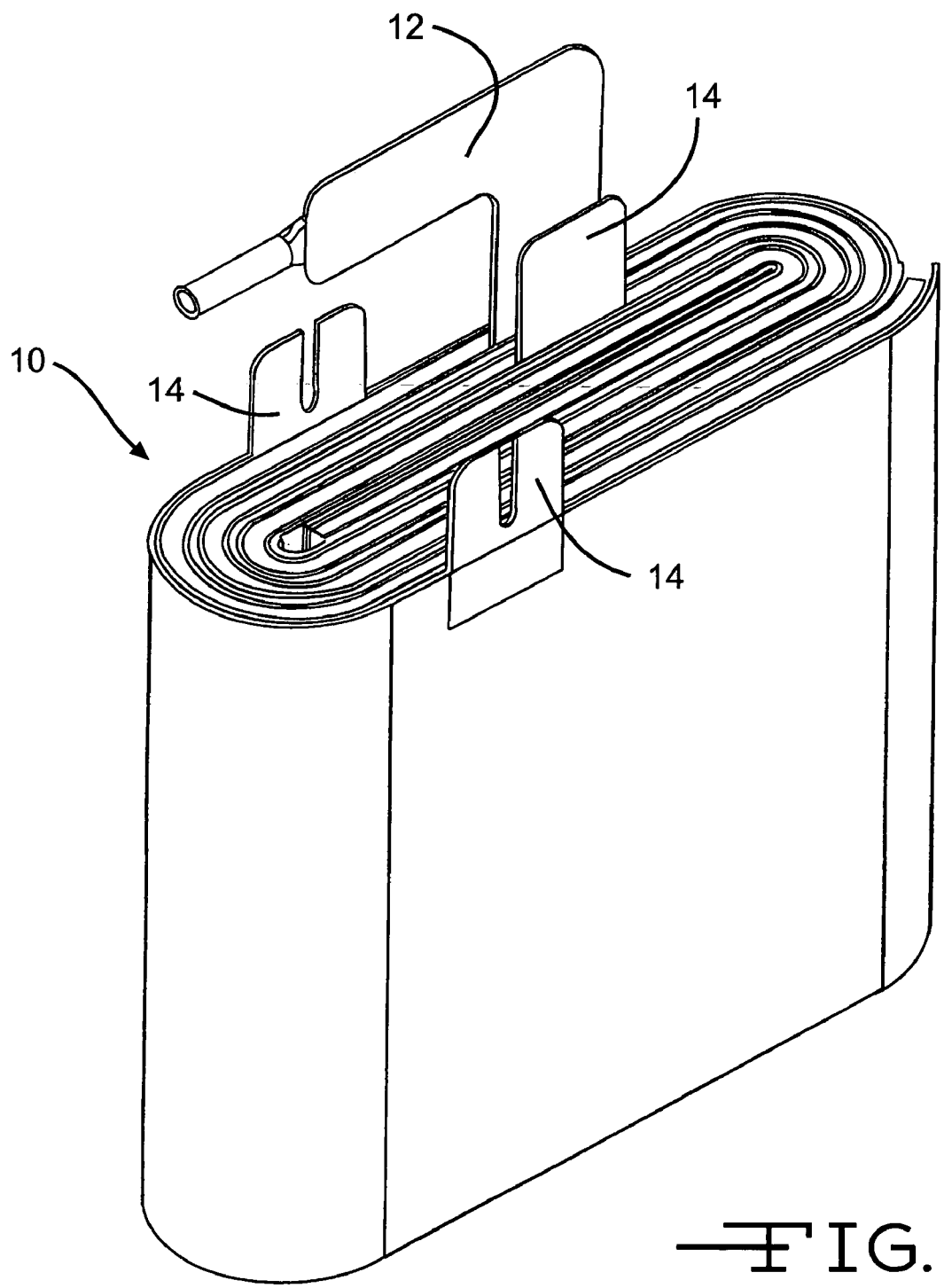
FIG. 1 is a perspective view of a traditionally wound cell having one wound cathode element and one wound anode element with a single anode connection to the cell wall at each side.
Figure 2:
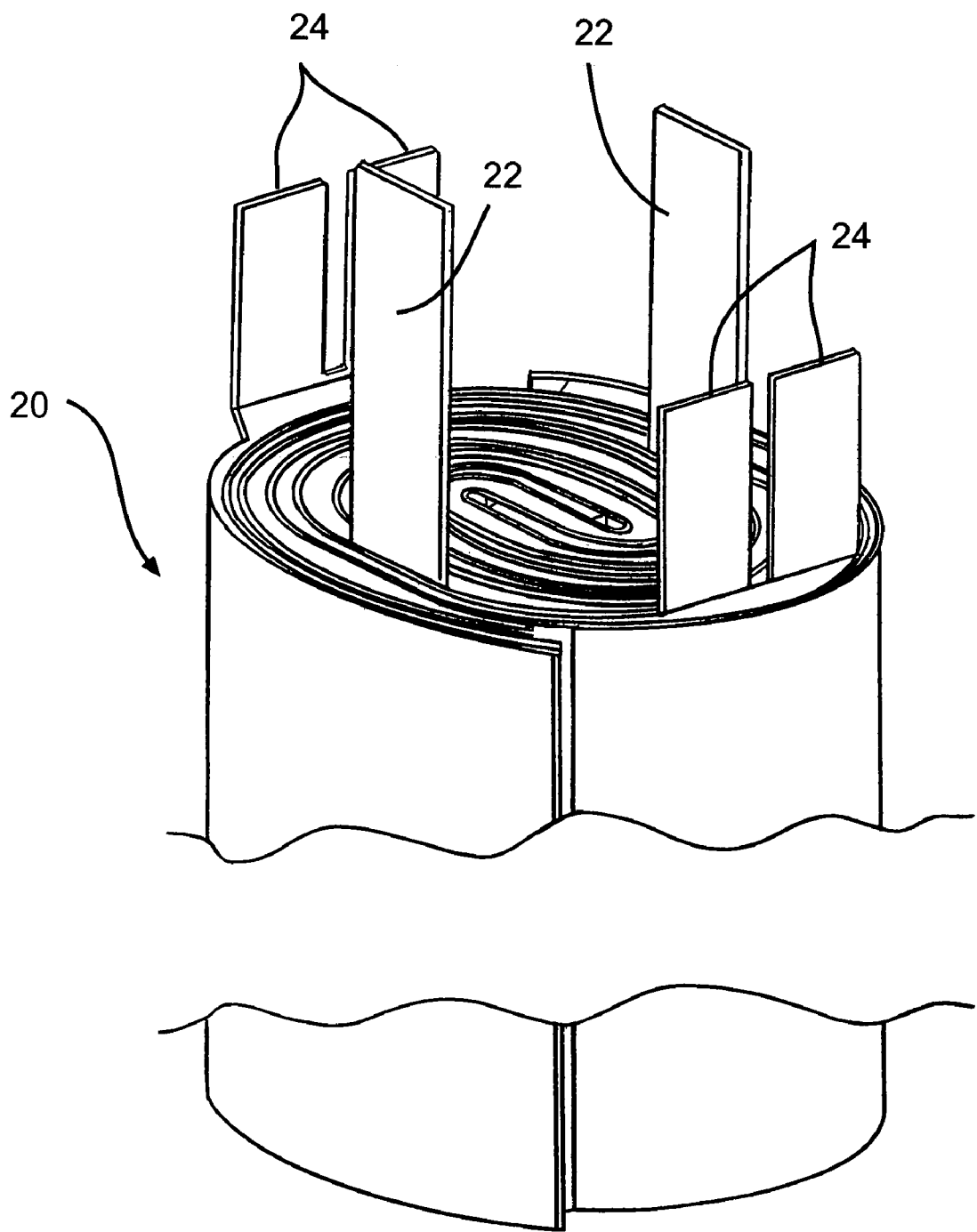
FIG. 2 is a perspective view of another traditionally wound cell having one wound cathode element and two wound anode elements with each anode element provided with a connector.
Figure 3:
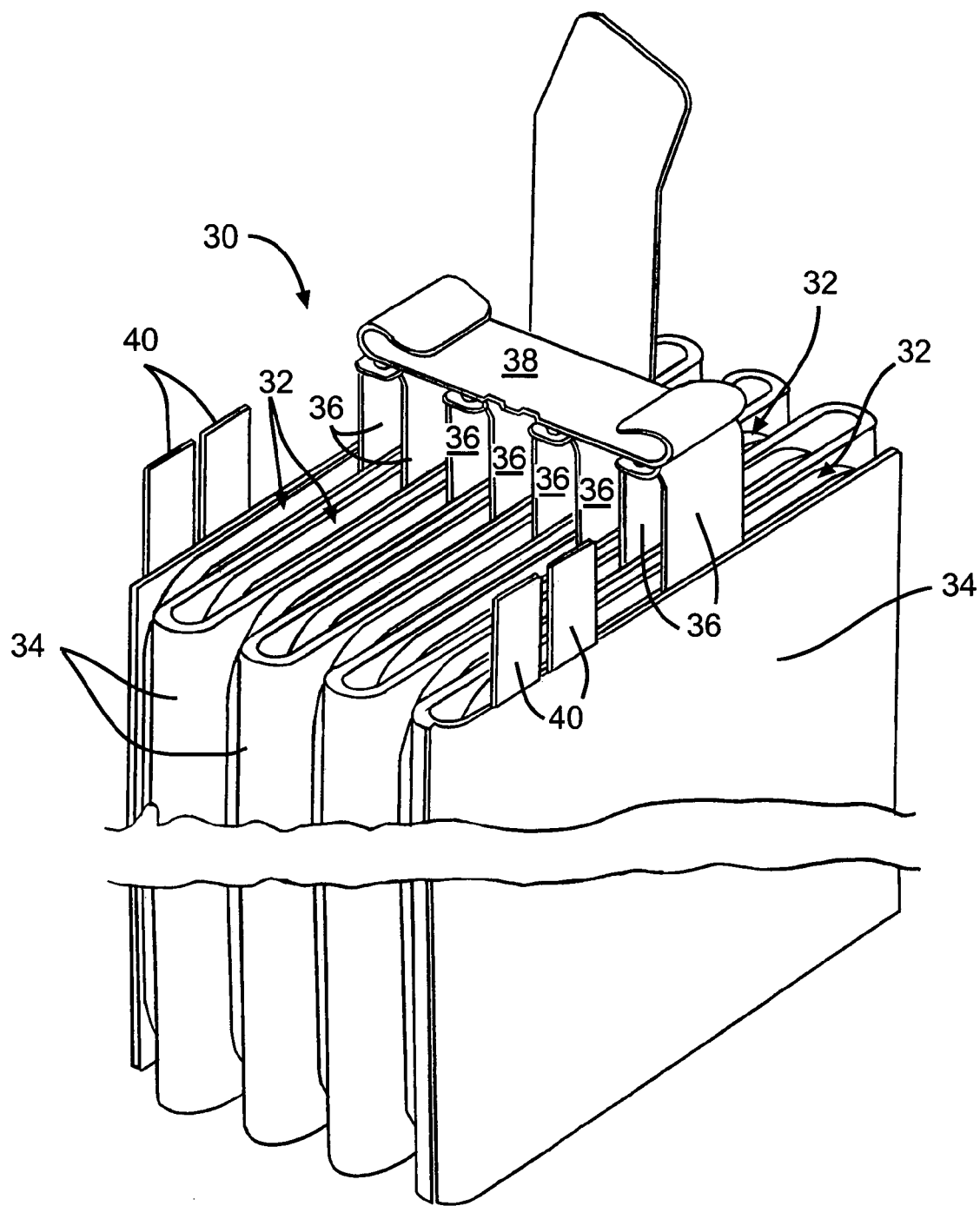
FIG. 3 is a perspective view of a traditional cell with cathode plates interleaved between a serpentine anode element.

In a present invention cell with anode plates independently connected to the case wall, one of the more problematic areas is for an internal short to occur at the center, bottom of any plate. In this pathway, the maximum length that the heat must travel to the case wall is half the length and the height of an individual plate. However, the potential for cell venting in such designs is minimized because the rate of heat leaving the cell is greater than that leaving any of the conventional cell types illustrated in FIGS. 1 to 3. For example, heat conduction through the anode pathway is approximately 16 times faster in a cell with eight anode plates as compared to a traditionally wound cell with the same total anode length. In other words, total inter-electrode surface area in the present cell designs is larger than any of the conventional cell types without jeopardizing safety because the rate of heat conduction through the anode pathway is approximately proportional to half an individual plate length, rather than the total anode length. Surface area is important in battery design because it increases the current draw capability of the battery.

Figure 4:
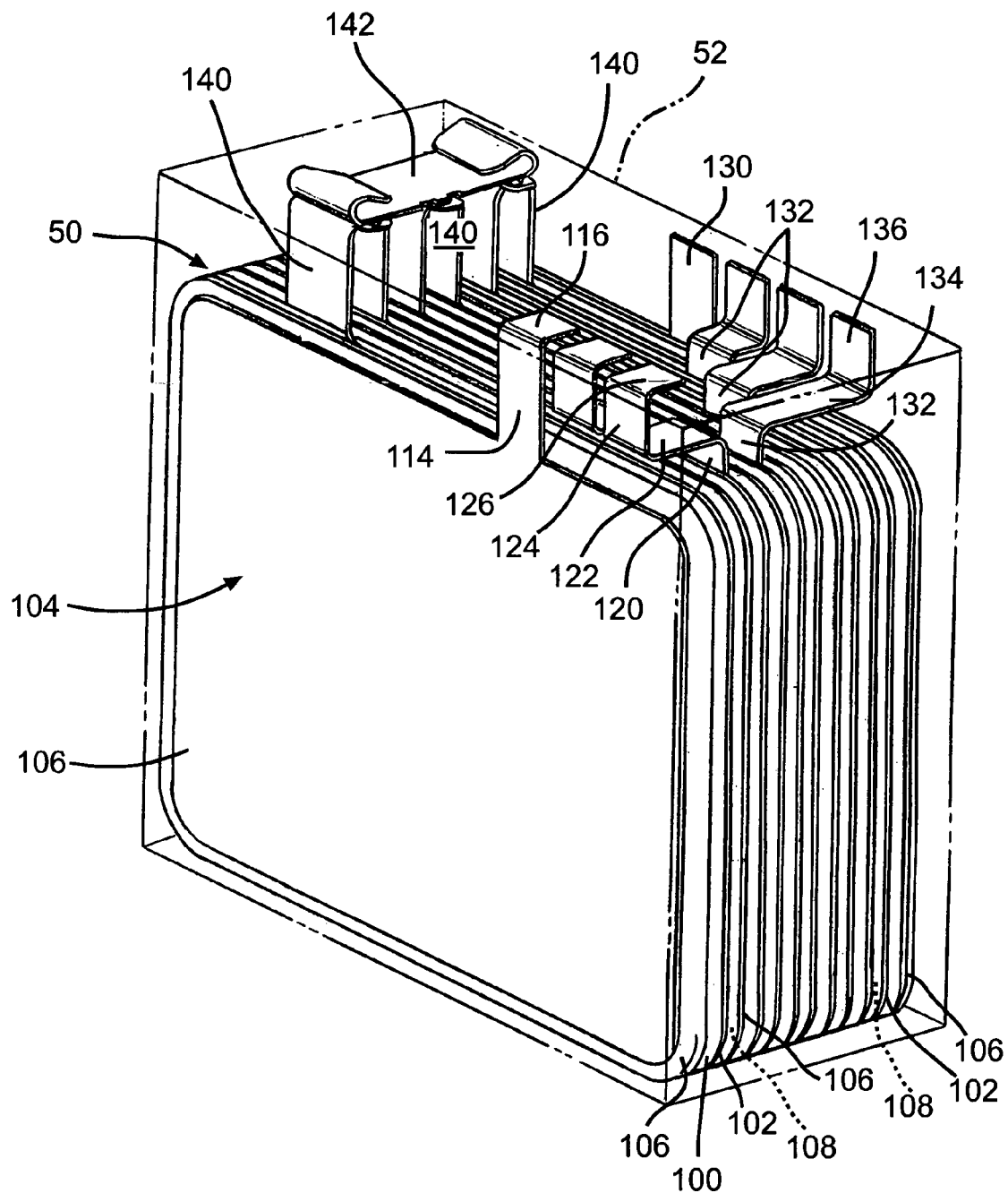
FIG. 4 is a perspective view of a cell stack having a casing shadow outline containing both anode and cathode plates with the anode plates independently connected to the case wall.
Figure 6:
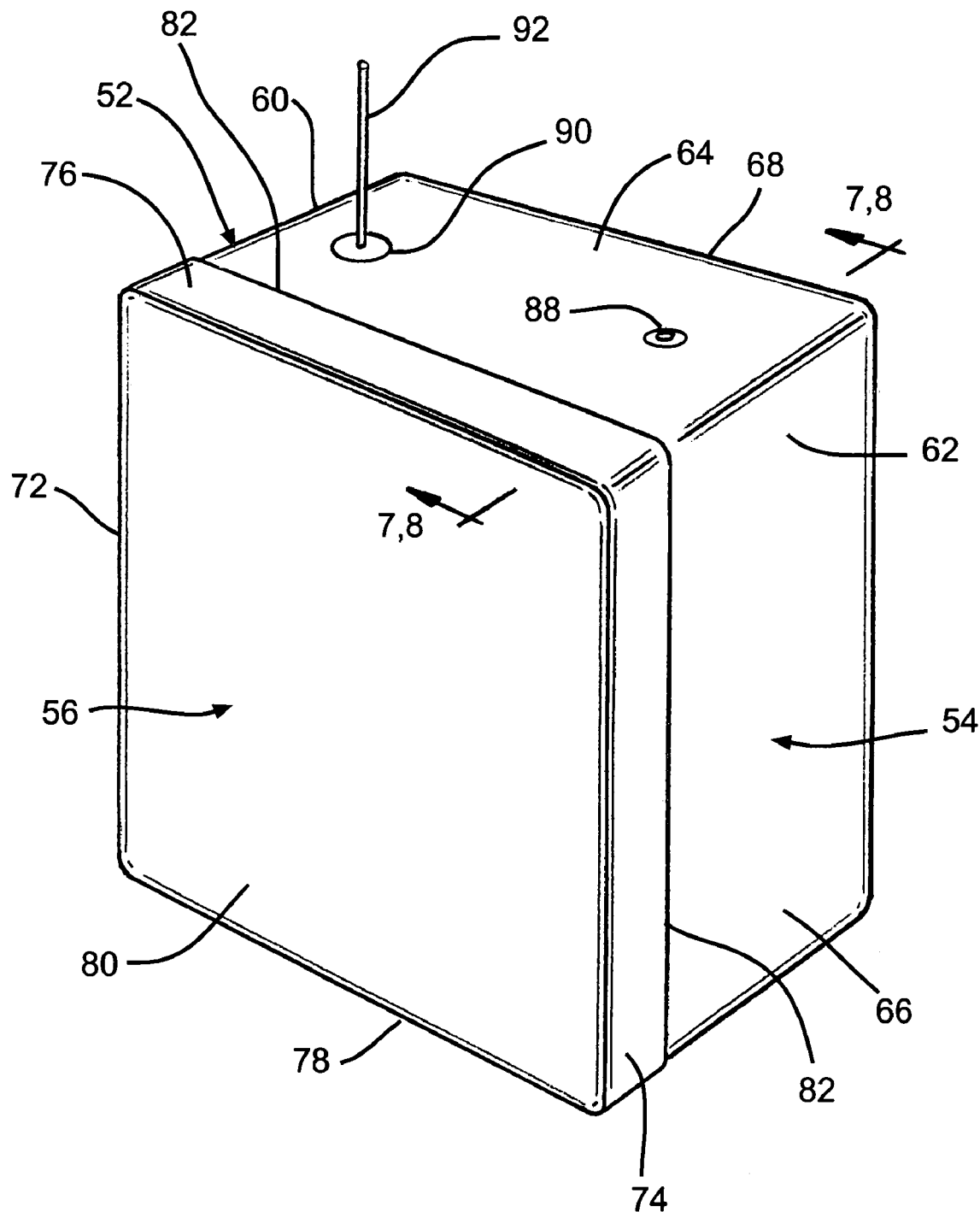
FIG. 6 is a perspective view of an exemplary casing according to the present invention.

Turning now to the drawings, FIG. 4 illustrates an electrochemical cell 50 according to one embodiment of the present invention. In this embodiment, the electrode assembly has both anode and cathode plate electrodes, and the anode plates are independently connected to the case wall. The anode electrical extension is shown in conjunction with a casing 52, for example of mating first and second clamshell portions 54 and 56 (FIG. 6). However, as those who are skilled in the art will realize, the anode electrode extension is useful with any casing design which allows access to the surface of the anode lead and the inside walls of the casing housing. The available designs include clamshell, prismatic, cylindrical, or button shapes. The casing 52 is of a conductive material, such as stainless steel. The mated clamshell portions 54 and 56 are sealed about their periphery to provide a hermetic enclosure for an electrode assembly.

In particular, the first clamshell portion 54 comprises spaced apart sidewalls 60 and 62 extending to and meeting with spaced apart sidewalls 64 and 66. The pairs of sidewalls 60, 62 and sidewalls 64, 66 meet each other at rounded corners and extend to an end wall 68. Opposite the end wall 68 is a continuous edge 70 (FIGS. 7 and 8) of the sidewalls 60, 62, 64, and 66.

The second clamshell portion 56 comprises spaced apart sidewalls 72 and 74 extending to and connecting with spaced apart sidewalls 76 and 78. The pairs of sidewalls 72 and 74 and sidewalls 76 and 78 meet at rounded corners and extend to an end wall 80. Opposite the end wall 80 is a continuous edge 82 of the sidewalls 72, 74, 76, and 78.

In one preferred embodiment shown in FIGS. 6, 7, and 8, the first clamshell 54 is sized to fit inside the periphery of the second clamshell 56 in a closely spaced relationship. This means that sidewalls 60 and 62 are somewhat shorter in length than sidewalls 72 and 74, sidewalls 64 and 66 are somewhat shorter in length than sidewalls 76 and 78, and end wall 68 is somewhat smaller in area than end wall 80.

In the constructions of FIGS. 7 and 8, lapping continuous edge 82 of clamshell 56 over continuous edge 70 of clamshell 54 creates a peripheral seam. In this embodiment, clamshell 54 is partially disposed inside clamshell 56 and weld 86 provides a hermetic seal at the peripheral seam. Butting the clamshell portions 54 and 56 together also can form the cell case. A laser beam from a welding source (not shown) creates weld 86.

The embodiment depicted in FIG. 6 shows an electrolyte fill opening 88 contained in sidewall 64 and a glass-to-metal seal 90 supporting a cathode terminal lead 92. The electrolyte fill opening 88 is closed using a closure means (not shown) to hermetically seal the cell 50.

The casing described herein is readily adapted for housing various types of electrochemical chemistries such as alkali metal/solid cathode or alkali metal/oxyhalide electrochemical cells of both the solid cathode and liquid cathode types. The electrochemical cell 50 housed in the illustrated casing is of the liquid electrolyte type comprising a cathode electrode 100 having a body of solid cathode material in the form of plates 102 comprising sheets pressed together and bonded against a cathode current collector. The cathode active material is preferably comprised of a metal, a metal oxide, a mixed metal oxide or a metal sulfide, and the cathode current collector is fabricated from a thin sheet of metal. Suitable materials for the current collector include nickel, aluminum, stainless steel, mild steel and titanium, with titanium being preferred.

Referring again to FIG. 4, cell 50 further includes an anode electrode, generally designated 104. The anode electrode comprises anode active plates 106, preferably lithium sheets pressed to the opposite sides of an anode current collector. The anode current collector is fabricated from a thin sheet of metal such as of nickel. The anode electrode 104 is in operative contact with the cathode electrode 100 through a thin sheet of separator material 108. The separator divides the cathode and anode plates to prevent shorting of the cell 50 by direct physical contact between the electrode plates.

Figure 5:
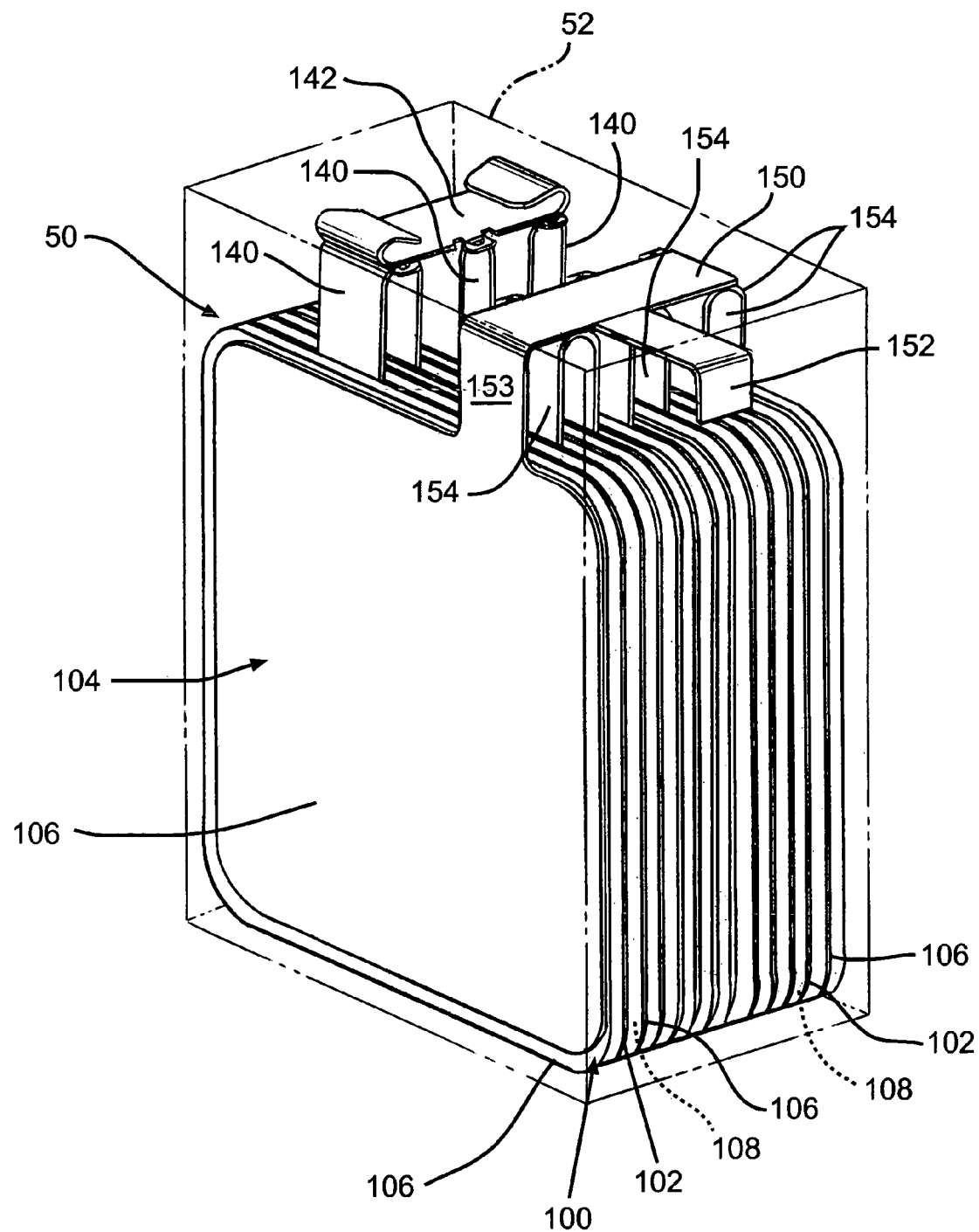
FIG. 5 is a perspective view of a cell stack with the casing shadow outline containing anode and cathode plates with the anode plates connected to the case via a bridge or bus.

As shown in FIG. 4, the anode current collector extension can be an individual piece attached to the case wall or, alternatively, it can be in the form of a header extension secured to the wall as shown in FIG. 5. Depending on the battery application, either embodiment may be preferred. The extension and the header are made of metal, preferably nickel, however, other materials also may be satisfactory. The extension can be flat such as a strap or of another geometric shape such as hexagonal, or triangular, as long as it transfers heat from the cell and can be attached to the casing wall. However, in general, the greater surface area, the greater the heats transfer.

In the embodiment shown in FIG. 4, two sets of anode current collector extensions are provided for connection to one of the casing halves shown in FIG. 7. In the first set, the current collector extension for the outermost anode plate comprises a first portion 114 extending from the anode current collector and being coplanar therewith and a second portion 116 extending substantially perpendicular to the first portion 114 and in a direction inwardly of the electrode assembly. Each of the remaining current collector extensions in the first set comprises a first portion 120 extending from the corresponding anode current collector and being coplanar therewith, a second portion 122 extending substantially perpendicular to the first portion and in a direction outwardly relative to the center of the electrode assembly, a third portion 124 extending substantially perpendicular to the second portion 122 and in a direction parallel to the first portion 120 and a fourth portion 126 extending substantially perpendicular to the third portion 124 and in a direction inwardly of the electrode assembly. Second portion 116 of the outermost extension and the fourth portions 126 of the remaining extensions are connected such as by welding to the same casing half, for example to casing half 54 shown in FIG. 7.

In the second set of anode current collector extensions, the extension for the outermost anode plate comprises a single section 130 extending from the anode current collector and being coplanar therewith. Each of the remaining current collector extensions in the second set comprises a first portion 132 extending from the corresponding anode current collector and being coplanar therewith, a second portion 134 extending substantially perpendicular to the first portion and in a direction outwardly relative to the center of the stack and a third portion 136 extending substantially perpendicular to the second portion and in a direction parallel to the first portion. Section 130 of the outermost current collector extension and portions 136 of the remaining current collection extensions are connected such as by welding to the same casing half as the various extensions from the first set described above, for example to casing half 54 shown in FIG. 7.

In the illustrative cell 50 shown in FIG. 4, individual cathode current connector tabs 140 extending from corresponding cathode current collectors are joined by a bridge connector 142 which, in turn, is connected to the cathode terminal lead, for example lead 94 shown in FIG. 6.

In an alternative arrangement illustrated in FIG. 8, anode current collector extensions 124, 136 are connected to the respective casing halves 56 and 54.

In the embodiment shown in FIG. 5, the anode current collector extensions are joined by a bridge 150 which, in turn, is attached to the inside surface of the casing by an extension tab 152. The anode current collector extensions comprise individual tabs extending from each of the anode plates that are joined together, such as by welding to bridge 150. In this embodiment, however, bridge 150 is part of the extension for the outermost anode plate. In particular, the current collector extension for the outermost anode plate comprises a first portion 153 extending from the anode current collector and being coplanar therewith, and bridge 150 comprising a second portion extending substantially perpendicular to the first portion and in a direction across substantially the entire width or thickness of the cell stack. Each of the remaining current collector extensions in the cell stack is connected to the bridge 150. Preferably, adjacent anode plates share a common inverted U-shaped extension, these being designated 154 in FIG. 5. This is the result of providing a pair of anode current collectors joined by a central strip in a wing-like formation. For a more detailed description of such a current collector formation, reference is made to U.S. Pat. No. 5,250,373 to Muffoletto et al., the disclosure of which is hereby incorporated by reference. The mid-point or apex of the U-shaped extension is joined to the bridge 150, preferably by welding.

Thus, the anode current collector extensions connect each of the anode plates to the conductive casing to enhance heat transfer out of the cell in the event of an internal short circuit. In the illustrated anode-cathode electrode assembly, the anode plates may be viewed as successive portions of the entire anode extending along a path cross-wise of the assembly cross-section, and the extensions connect each of these successive portions to the cell casing.

Figure 9:
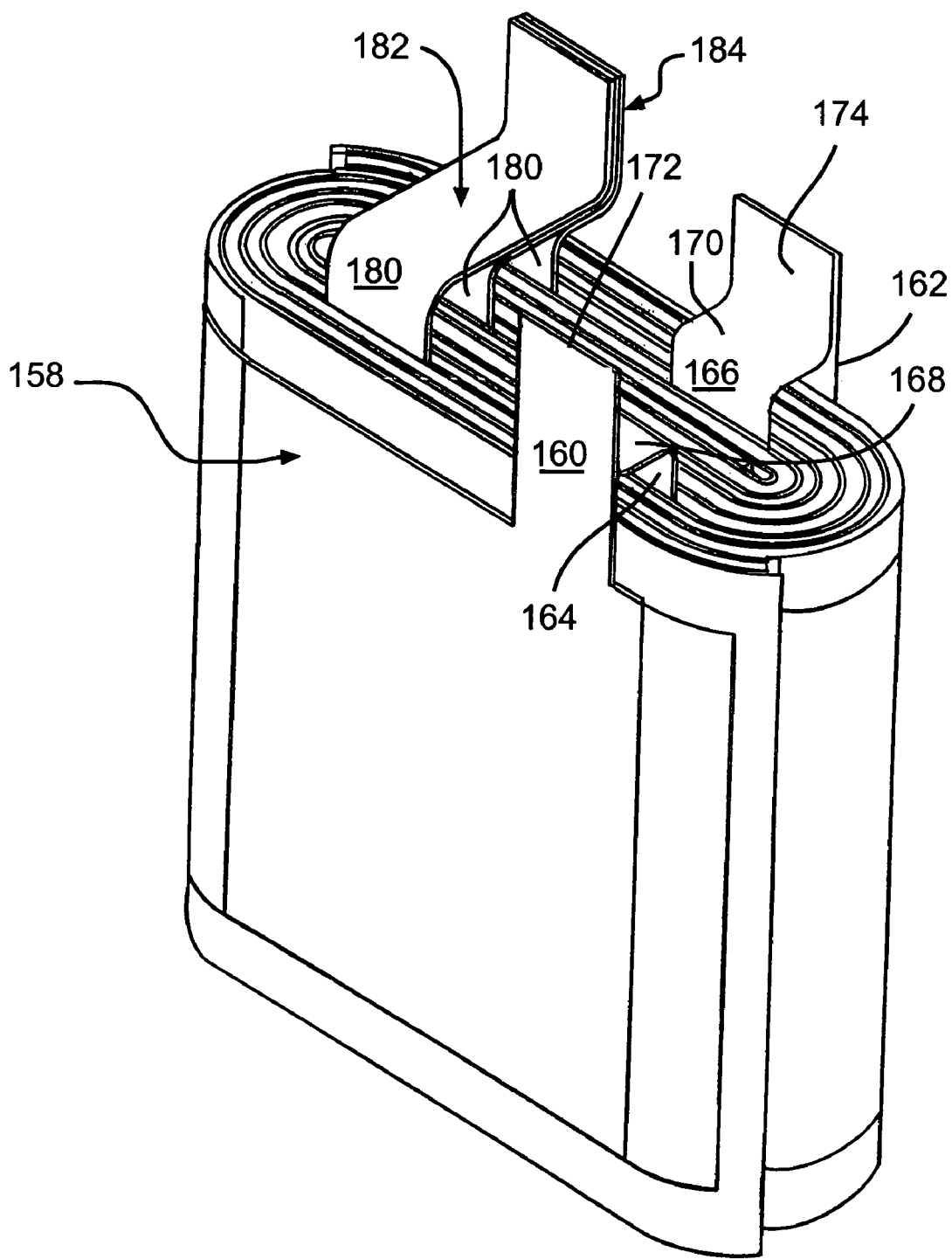
FIG. 9 is a perspective view of a wound cell incorporating the invention having several anode elements with multiple parallel connections.

As shown in FIG. 9, the use of anode electrode current collector extensions is not limited to a plate structure, but may also be used in wound electrode configurations, such as the jellyroll and galaxy wound arrangements described hereinabove and known to those skilled in the art. Anode electrode current collector extensions are provided for the portions of the length of the anode electrode 158 located in the cross-section of the wind. In particular, anode electrode 158 is in the form of a continuous strip having successive portions along its length, and when the strip is in a wound configuration those successive portions extend along a path cross-wise of the anode-cathode electrode assembly cross-section. The current collector extensions are connected to each of these successive portions to enhance heat transfer out of the cell in the event of an internal short circuit.

In particular, the current collector extensions 160 and 162 for the outermost portions of the continuous anode 158 comprise single sections extending from the anode current collector and being generally coplanar therewith. Associated with extensions 160 and 162 are extensions for two other portions of the anode length. These extensions comprise first portions 164 and 166 extending from the anode current collector and being generally coplanar therewith, second portions 168 and 170 extending substantially perpendicular to the first portions 164 and 166, respectively, and in a direction along the cross-section of the wind, and third portions 172 and 174 extending substantially perpendicular to the second portions 168 and 170, respectively, and contacting current collector extension 160, 162 for the outermost portions of the continuous anode. The remaining portions of the length of the anode electrode located in the cross-section of the wind are provided with extensions comprising first portions 180 extending from the anode current collector and being coplanar therewith, second portions 182 extending generally perpendicular to the first portions and in a direction across the cross-section of the wind and third portions 184 extending generally perpendicular to the second portions and away from the wind and preferably joined together. The current collector extensions 160 and 162 contacted by respective portions 172 and 174 and the plurality of contacted third portions 184 are connected to the cell casing, preferably by welding. The cathode electrode is connected to an external cathode terminal pin in a known manner.

Figure 10:
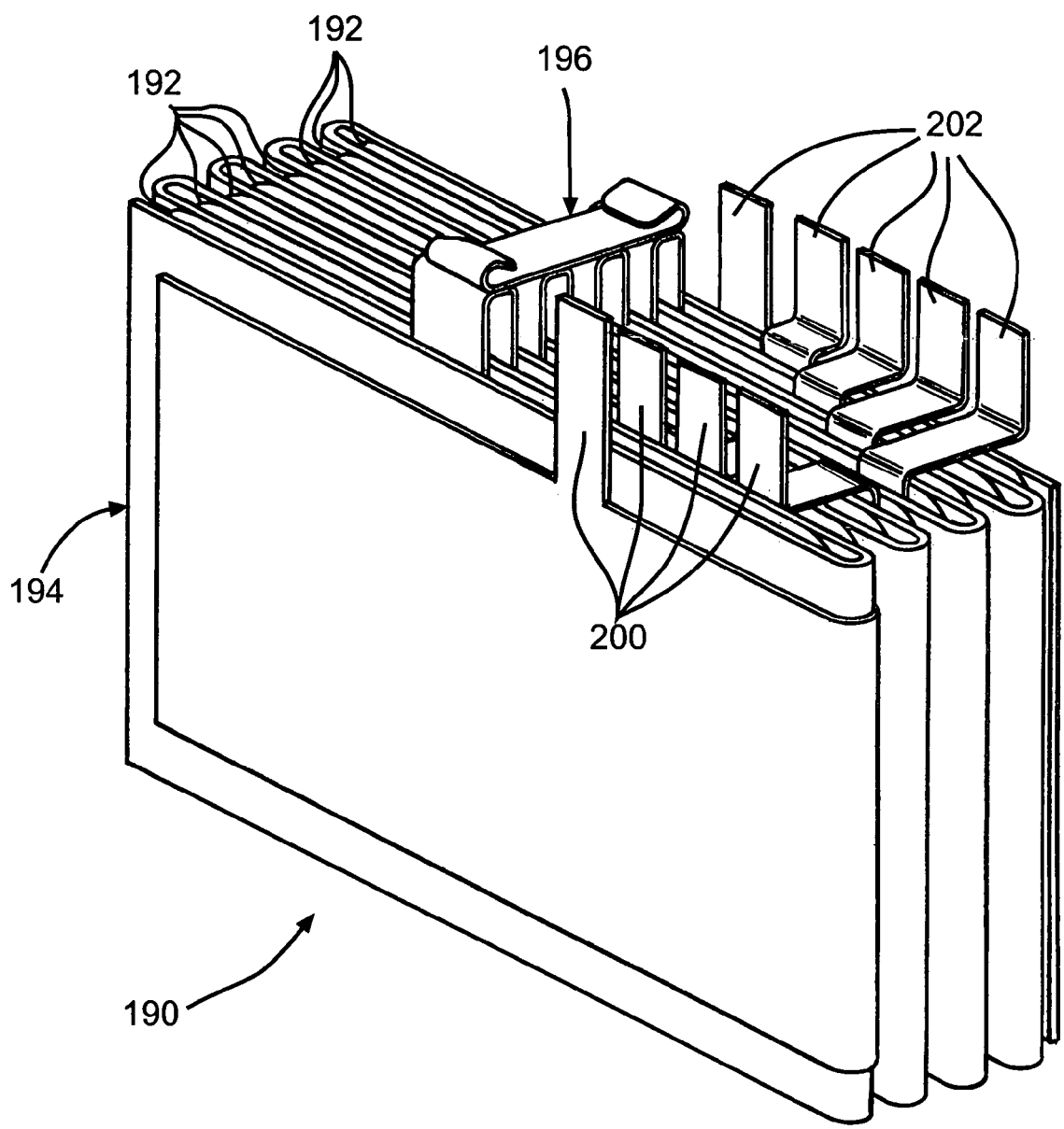
FIG. 10 is a perspective view of a cell incorporating the invention having cathode plate elements interleaved between the folds of a serpentine anode element.

FIG. 10 illustrates an electrode assembly having one of the electrodes comprising a plurality of plates and the other electrode in the form of a strip arranged in a serpentine path around the plates. In the illustrated cell 190, the cathode comprises a plurality of plates 192 and the anode 194 is the continuous strip wound along a serpentine path around the cathode plates. The anode strip has successive portions along its length, and when the strip is in a serpentine configuration those successive portions extend along a path cross-wise of the cross-section of the anode-cathode assembly. The anode current collector extensions are connected to each of those successive portions and to the cell casing to enhance heat transfer out of the cell in the event of an internal short circuit.

The cathode electrode 196 is similar to those of the cells of FIGS. 4 and 5. Two sets of anode current collector extensions 200 and 202 are provided in a manner similar as those in the cell of FIG. 4. Alternatively, an arrangement of anode current collector extensions like that of the cell of FIG. 5 can be provided.

As shown in FIGS. 7 and 8, the terminal lead 92 connected to the cathode current collector via bridge 142 and tabs 140 extends through a header assembly comprising the glass-to-metal seal 90 fitted in the wall of the casing. Lead 92 is the positive electrical terminal, being connected to the cathode electrode. As stated previously, the anode electrode is in operative contact with the conductive casing through direct physical contact of the anode current collector extensions with the casing, in particular with the inner surface of the casing.

By way of example, in an illustrative primary cell, the active material of the cathode body is a silver vanadium oxide cathode material as described in U.S. Pat. Nos. 4,310,609 and 4,391,729 or copper silver vanadium oxide as described in U.S. Pat. Nos. 5,472,810 and 5,516,340, all assigned to the assignee of the present invention, the disclosures of which are hereby incorporated by reference. The cathode current collector can be titanium, terminal lead 92 can be molybdenum, and the separators can be of polypropylene. The activating electrolyte can be a 1.0M to 1.4M solution of $LiAsF_6$ or $LiPF_6$ in a 50:50 mixture of, by volume, 1,2-dimethoxyethene and propylene carbonate. Glass seal 90 can be of TA-23 Hermetic sealing glass, while the casing can be of stainless steel.

This electrochemical system is of a primary cell type. However, those skilled in the art will readily recognize that the casing of the present invention is readily adopted to house both primary electrochemical systems of either a solid cathode or liquid catholyte type, or a secondary cell such as a lithium ion cell having a carbonaceous negative electrode and lithium cobalt oxide positive electrode.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, "hairy carbon" etc.), which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

The current collector of the present invention can also be employed in a cell having a case-positive electrical configuration. In particular, replacing lithium anode elements with cathode plates provides a case-positive electrical configuration. Accordingly, cathode plates would be replaced by lithium anode plates, sandwiched together and against the current collector of the present invention serving as an anode current collector that, in turn, is connected to the terminal lead and insulated from the casing by the glass-to-metal seal. In all other respects, the anode current collector in the case-positive configuration is similar to that previously described with respect to cell 14 having the case-negative configuration.

The present invention may also be used with acid or alkaline-based batteries.

Now, it is therefore apparent that the present invention accomplishes its intended objects. While embodiments of the present invention have been described in detail, that is for the purpose of illustration, not limitation.

What is claimed is:

1. An electrochemical cell, comprising:
    a) a casing of electrically conductive material;
    b) first and second opposite polarity electrodes housed inside the casing in electrical association with each other and having a separator disposed there between, wherein each of the electrodes includes a current collector;
    c) an electrolyte activating the first and second electrodes;
    d) at least one of the first and second electrodes comprising a first plate, a second plate and at least one third plate intermediate the first and second plates, each of the first, second and third plates comprising a current collector having an electrode active material contacted thereto with an extension portion extending from the current collector being devoid of the electrode active material, wherein the respective extension portions of the first plate, the second plate and the at least one third plate are independently electrically connected to at least three separate locations of the conductive casing to enhance heat transfer out of the cell in the event of an internal short circuit; and
    e) means for connecting the other of the first and second electrodes to a terminal insulated from and extending through the casing.

2. The electrochemical cell of claim 1 wherein the electrode comprising the first and second plates and the at least one third plate is an anode.

3. The electrochemical cell of claim 1 as a primary cell and the anode comprises lithium and the cathode comprises an active material selected from the group consisting of silver vanadium oxide, copper silver vanadium oxide, manganese dioxide, cobalt oxide, nickel oxide, copper oxide, copper sulfide, iron sulfide, iron disulfide, titanium disulfide, copper vanadium oxide, and mixtures thereof.

4. The electrochemical cell of claim 1 wherein the casing comprises two portions joined to each other.

5. The electrochemical cell of claim 4 wherein there are at least four plates of the at least one of the first and second electrodes and each of the four plates comprises a current collector having an extension portion and wherein at least two of the four extension portions are electrically connected to the casing as a pair with the other of the two extension portions being individually connected to either the same casing portion as that to which the pair of extension portions is connected, or to the other casing portion.

6. The electrochemical cell of claim 1 wherein there are at least four plates of the at least one of the first and second electrodes and each of the four plates comprises a current collector having an extension portion and wherein at least two of the four extension portions are electrically connected to the casing as a pair with the other of the two extension portions being individually connected to one of the casing portions apart from where the pair of extension portions is connected.

7. The electrochemical cell of claim 1 associated with an implantable medical device powered by the cell.

8. An electrochemical cell, comprising:
a) a casing of electrically conductive material;
b) an electrode assembly comprising first and second opposite polarity electrodes housed inside the casing in electrical association with each other and having a separator disposed therebetween, wherein each of the electrodes includes a current collector;
c) an electrolyte activating the first and second electrodes;
d) at least one of the electrodes being in a continuous strip wound in a serpentine configuration comprising successive portions extending along a path cross-wise of a cross-section of the electrode assembly, the one electrode comprising a current collector having at least one tab extending from each successive portion, wherein the tabs comprise a first tab, a second tab and at least one third tab intermediate the first and second tabs, each tab being independently electrically connected to the conductive casing to enhance heat transfer out of the cell in the event of an internal short circuit; and
e) means for connecting the other of the first and second electrodes to a terminal insulated from and extending through the casing.

9. The electrochemical cell of claim 8 wherein the wound electrode is an anode.

10. The electrochemical cell of claim 8 wherein the first and second electrodes are in a wound configuration forming a jellyroll-type electrode assembly.

11. The electrochemical cell of claim 8 wherein the other electrode comprises a plurality of plates and the wound electrode follows a serpentine path around the plates.

12. The electrochemical cell of claim 8 as a primary cell and the anode is comprised of lithium and the cathode is comprised of an active material selected from the group consisting of silver vanadium oxide, copper silver vanadium oxide, manganese dioxide, cobalt oxide, nickel oxide, copper oxide, copper sulfide, iron sulfide, iron disulfide, titanium disulfide, copper vanadium oxide, and mixtures thereof.

13. The electrochemical cell of claim 8 associated with an implantable medical device powered by the cell.

14. An electrochemical cell comprising:
a) a casing of electrically conductive material;
b) an electrode assembly comprising an anode and a cathode housed inside the casing in electrical association with each other and having a separator disposed there between;
c) an electrolyte activating the first and second electrodes;
d) at least the anode comprising a continuous strip wound in a serpentine configuration having successive portions extending along a path crosswise of a cross-section of the electrode assembly, wherein the anode comprises a current collector having at least one tab extending from each of the successive portions of the serpentine anode, and wherein the tabs comprise a first tab, a second tab and at least one third tab located intermediate the first and second tabs, each of the tabs being independently electrically connected to the conductive casing to enhance heat transfer out of the cell in the event of an internal short circuit; and
e) means for connecting the cathode to a terminal insulated from and extending through the casing.

15. The electrochemical cell of claim 14 wherein the anode comprises a plurality of plates defining the successive portions.

16. The electrochemical cell of claim 14 wherein the anode is in the form of a strip in a wound configuration and the successive portions are at spaced locations along a length of the strip.

17. The electrochemical cell of claim 14 wherein the cathode comprises a plurality of plates and the anode is in the form of a strip arranged in a serpentine path wound around the plates and the successive portions are at spaced locations along the strip.

18. The electrochemical cell of claim 14 as a primary cell and the anode comprises lithium and the cathode comprises an active material selected from the group consisting of silver vanadium oxide, copper silver vanadium oxide, manganese dioxide, cobalt oxide, nickel oxide, copper oxide, copper sulfide, iron sulfide, iron disulfide, titanium disulfide, copper vanadium oxide, and mixtures thereof.

19. The electrochemical cell of claim 14 associated with an implantable medical device powered by the cell.

20. The electrochemical cell of claim 1 wherein the respective extension portions of the first plate, the second plate and the at least one third plate are electrically connected in a staggered manner along a length of a wall of the casing.

21. The electrochemical cell of claim 1 wherein the second electrode comprises an elongate plate wound in a serpentine path around the at least three plates of the first electrode.

22. The electrochemical cell of claim 1 wherein the casing comprises first and second casing sidewalls joined by an intermediate sidewall with the first extension portion being connected to the first casing sidewall, the second extension portion being connected to the second casing sidewall and the third extension portion being connected to either the first or the second casing sidewall at a location parallel to where either the first or the second extension portion is connected.

* * * * *